United States Patent
Sutter, Jr. et al.

(10) Patent No.: US 8,820,839 B1
(45) Date of Patent: Sep. 2, 2014

(54) HEAD RESTRAINT ASSEMBLY

(71) Applicants: Robert R. Sutter, Jr., Rockford, MI (US); Craig A. Ulman, Rockford, MI (US); Richard Perreault, Belmont, MI (US)

(72) Inventors: Robert R. Sutter, Jr., Rockford, MI (US); Craig A. Ulman, Rockford, MI (US); Richard Perreault, Belmont, MI (US)

(73) Assignee: Gill Industries, Inc., Grand Rapids, MI (US)

( * ) Notice: Subject to any disclaimer, the term of this patent is extended or adjusted under 35 U.S.C. 154(b) by 0 days.

(21) Appl. No.: 13/761,856

(22) Filed: Feb. 7, 2013

Related U.S. Application Data

(60) Provisional application No. 61/637,492, filed on Apr. 24, 2012.

(51) Int. Cl.
*B60N 2/48* (2006.01)
(52) U.S. Cl.
CPC .................................. *B60N 2/4855* (2013.01)
USPC ........................................................ 297/408
(58) Field of Classification Search
CPC .... B60N 2/4855; B60N 2/485; B60N 2/4817; B60N 2/4847; B60N 2/487
USPC ........................................................ 297/408
See application file for complete search history.

(56) References Cited

U.S. PATENT DOCUMENTS

| | | | | |
|---|---|---|---|---|
| 4,266,760 A * | 5/1981 | Matsui et al. | ............. | 297/408 X |
| 4,304,439 A * | 12/1981 | Terada et al. | ............. | 297/408 X |
| 5,669,668 A * | 9/1997 | Leuchtmann | ................. | 297/408 |
| 6,074,010 A * | 6/2000 | Takeda | ....................... | 297/408 X |
| 6,074,011 A * | 6/2000 | Ptak et al. | ....................... | 297/408 |
| 6,302,485 B1 * | 10/2001 | Nakane et al. | ................. | 297/408 |
| 6,880,890 B1 * | 4/2005 | DeBrabant | ..................... | 297/408 |
| 6,910,740 B2 * | 6/2005 | Baker et al. | .................... | 297/408 |
| 6,926,367 B2 * | 8/2005 | Tomimatsu | ............... | 297/408 X |
| 7,341,312 B2 * | 3/2008 | Gauthier et al. | .............. | 297/408 |
| 7,427,108 B2 * | 9/2008 | Hermansson et al. | ......... | 297/408 |
| 7,429,082 B2 * | 9/2008 | Kraft et al. | .................... | 297/408 |
| 7,431,400 B2 * | 10/2008 | Brawner | ........................ | 297/408 |
| 7,717,516 B2 * | 5/2010 | Sutter et al. | ................ | 297/408 X |
| 7,717,517 B2 * | 5/2010 | Yamane et al. | ................ | 297/408 |
| 7,758,126 B2 * | 7/2010 | Haase | ............................ | 297/408 |
| 8,246,116 B1 * | 8/2012 | Sutter et al. | ..................... | 297/408 |
| 2005/0029853 A1 * | 2/2005 | Gauthier et al. | .............. | 297/408 |
| 2007/0170766 A1 * | 7/2007 | Brawner | ........................ | 297/408 |
| 2007/0284929 A1 * | 12/2007 | Keller et al. | ..................... | 297/408 |
| 2008/0073963 A1 * | 3/2008 | Mauro et al. | ................... | 297/408 |
| 2008/0203801 A1 * | 8/2008 | Jammalamadaka et al. | .. | 297/408 |
| 2008/0277989 A1 * | 11/2008 | Yamane et al. | ................ | 297/408 |
| 2009/0179475 A1 * | 7/2009 | Haase | ............................ | 297/408 |

* cited by examiner

*Primary Examiner* — Rodney B White
(74) *Attorney, Agent, or Firm* — Dickinson Wright PLLC

(57) ABSTRACT

A head restraint assembly for pivotally supporting a head restraint above a seat back comprises a bracket pivotally mounting at least one head restraint support, a lock element linearly movably disposed in the bracket, and a spring element biasing the lock element in a position of engagement with the at least one head restraint support. The spring element includes a portion extending beyond the lock element and associated with the bracket to fix the position of the spring element relative to the bracket. The head restraint support is pivotally moveable between upright and folded positions. The lock element is selectively linearly movable from a position of engagement with the head restraint support, in which position of engagement the head restraint support is fixed in the upright position, to a position of disengagement in which the head restraint support is pivotally moveable between the upright and folded positions thereof.

14 Claims, 7 Drawing Sheets

HEAD RESTRAINT ASSEMBLY

CROSS-REFERENCE TO RELATED APPLICATIONS

This application is related to, and claims the benefit of priority from, U.S. Provisional Patent Application Ser. No. 61/637,492, filed 24 Apr. 2012, the disclosure of which is incorporated herein by reference in its entirety.

FIELD OF THE INVENTION

The invention relates generally to vehicle head restraints and more particularly to articulating head restraints.

BACKGROUND

Head restraints typically extend upward from the top of a vehicle seatback and are anchored within the seatback. Head restraints serve to protect vehicle occupants from suffering serious injury due to sudden movement of the vehicle, such as, for instance, is experienced in vehicle collisions.

While head restraints are necessary in order to insure passenger safety, at times the head restraints can present difficulties. For example, head restraints can obstruct a driver's view when looking rearward. Also, if a seat is folded forward to allow a passenger to enter the rear portion of a vehicle, the head restraint may contact an object in front of the seat to stop the seat from fully folding down. In vehicles with seats that fold flat into the floor, head restraints must be removed or additional stowage space in the floor of the vehicle must be provided.

U.S. Pat. No. 7,717,516, the disclosure of which is incorporated herein by reference in its entirety, describes a head restraint assembly having a locking assembly 17 that includes a lock element 18 that is received in, and slidingly linearly moveable relative to, a chamber 19 provided in the bottom of a bracket 1 adjacent to the position where one of a pair of head restraint supports 7 is located. See FIGS. 1 through 3. The locking assembly 17 includes a spring element 20 received in a hollow defined in the top portion of lock element 18. The opposite ends of the spring element 20 are captured between an upper wall 18a of the lock element 18 and spring stop 19a projecting into the chamber 19 so that tension in spring element 20 urges the lock element 18 upward. See FIG. 3.

As shown in FIGS. 3 and 5, the spring element 20 in the above-described embodiment is inserted into the into the lock element 18 by inserting the spring element 20 through a small opening 19b defined through a wall of the bracket 1 adjacent the lock element 20. This is a time-consuming process which adds to the expense of manufacturing the head restraint assembly. Moreover, performance of the internal spring stop 19a defined on the bracket 1 is affected by small tolerance changes, and so is difficult to manufacture.

SUMMARY OF THE DISCLOSURE

There is disclosed a head restraint assembly for pivotally supporting a head restraint above a seat back, the head restraint assembly comprising: A bracket pivotally mounting at least one head restraint support, the at least one head restraint support pivotally moveable relative to the bracket between upright and folded positions; a lock element that is linearly movably disposed in the bracket, the lock element being selectively slidingly linearly movable from a position of engagement with the at least one head restraint support, in which position of engagement the at least one head restraint support is fixed in the upright position, to a position of disengagement in which the at least one head restraint support is pivotally moveable between the upright and folded positions thereof; and a spring element biasing the lock element in the position of engagement with the at least one head restraint support, the spring element including a portion extending beyond the lock element and associated with the bracket to fix the position of the spring element relative to the bracket.

In one embodiment, the spring element includes a coil portion captured in a hollow portion of the lock element, and the portion extending beyond the lock element comprises a hanger portion. The hanger portion is associated with the bracket to fix the position of the spring element relative to the bracket.

Per one feature, the spring element may be monolithic and, moreover, may comprise a linear portion disposed in the hollow interior of the coil portion. The linear portion extends from a bottom end of the coil portion and through a top end of the coil portion, and terminates in the hanger portion proximate the top end of the coil portion.

In one form, the head restraint assembly may include a remote release actuator effecting selective linear movement of the lock element between the positions of engagement and disengagement. The remote release actuator may, for instance, comprise a cable release.

According to another feature, the lock element includes a lock abutment which engages the at least one head restraint support in the position of engagement of the lock element to thereby fix the at least one head restraint support in the upright position. Per one embodiment, the lock element and lock abutment may form a monolithic structure. The lock element and lock abutment may be selectively removable from the bracket.

BRIEF DESCRIPTION OF THE DRAWINGS

The present invention will be described with reference to the attached drawings which are given as non-limiting examples only, in which.

WRITTEN DESCRIPTION

Figure 1:
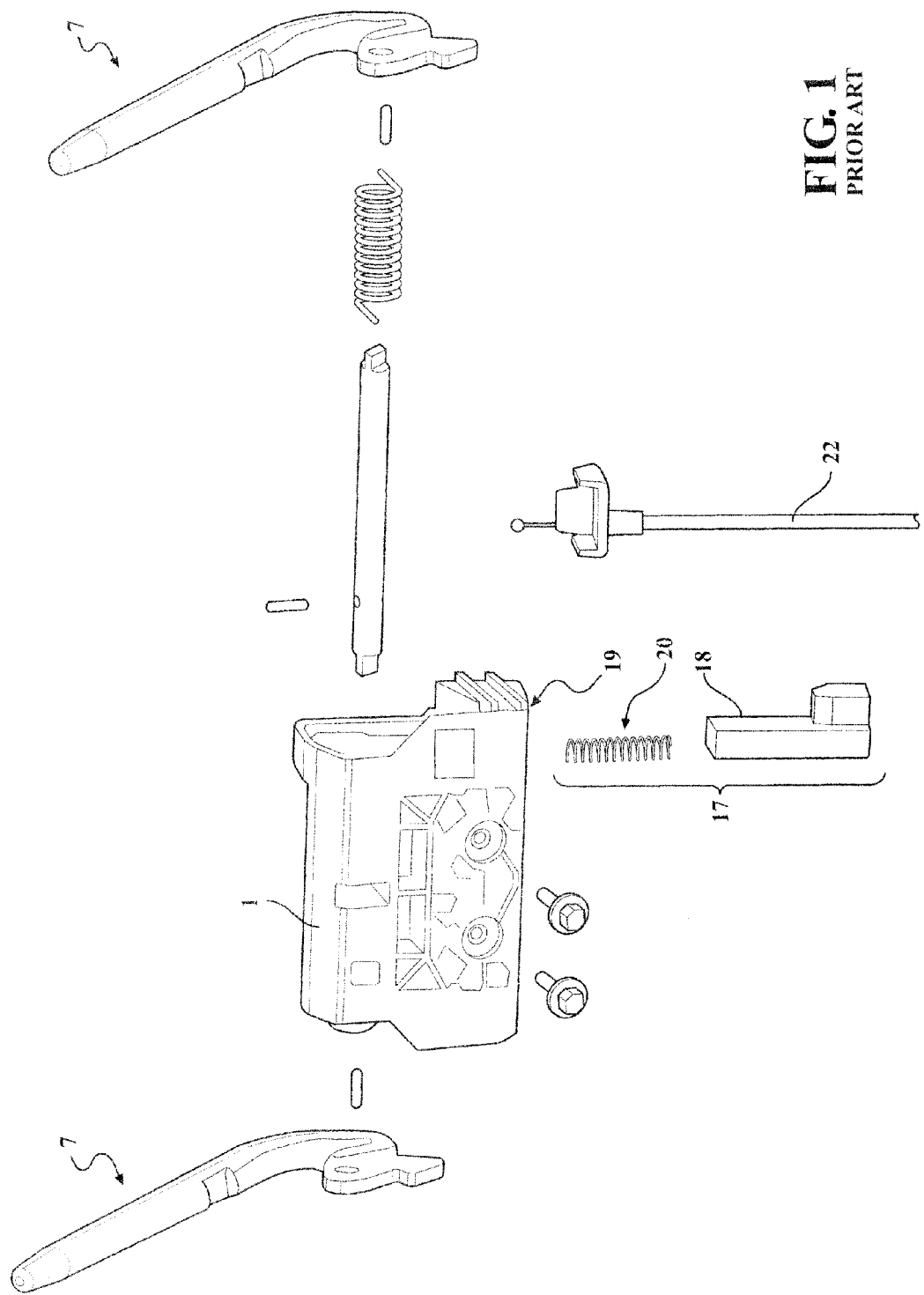
FIG. 1 is a perspective exploded view of a head restraint assembly according to the prior art.
Figure 2:
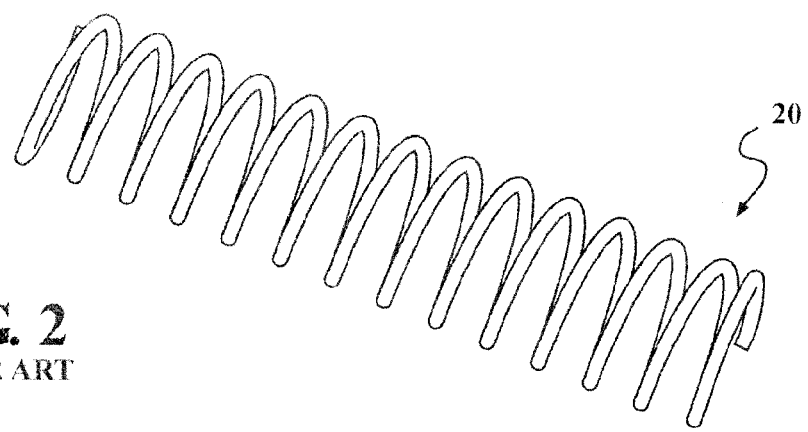
FIG. 2 is a perspective view of the spring element incorporated into the prior art head restraint assembly of FIG. 1.

Referring now to FIGS. 6 through 11, wherein like numerals refer to like or corresponding parts, the present invention can be seen to generally comprise a head restraint assembly including a bracket 100 pivotally mounting at least one head restraint support 110, the at least one head restraint support pivotally moveable relative to the bracket between upright and folded positions; a lock element 120 that is linearly movably disposed in the bracket 100, the lock element 120 being selectively slidingly movable from a position of engagement with the at least one head restraint support 110, in which position of engagement the at least one head restraint support is fixed in the upright position, to a position of disengagement in which the at least one head restraint support 110 is pivotally moveable between the upright and folded positions thereof; and a spring element 130 biasing the lock element 120 in the position of engagement with the at least one head restraint support 120, the spring element including, as described further below, a portion extending beyond the lock element 120 and associated with the bracket 100 to fix the position of the spring element 130 relative to the bracket 100.

Except as otherwise indicated, the head restraint assembly of the exemplary embodiment may be as disclosed in U.S. Pat. No. 7,717,516 or, alternatively, may take other known forms, as desired.

According to the exemplary embodiment, a pair of head restraint supports 110 are provided, each such support 110 being pivotally mounted on the bracket 100 and moveable between upright and folded positions thereof, per convention. However, it will be appreciated that the present invention can be utilized in a head restraint assembly comprised of one, two, or even more head restraint supports.

Figure 6:
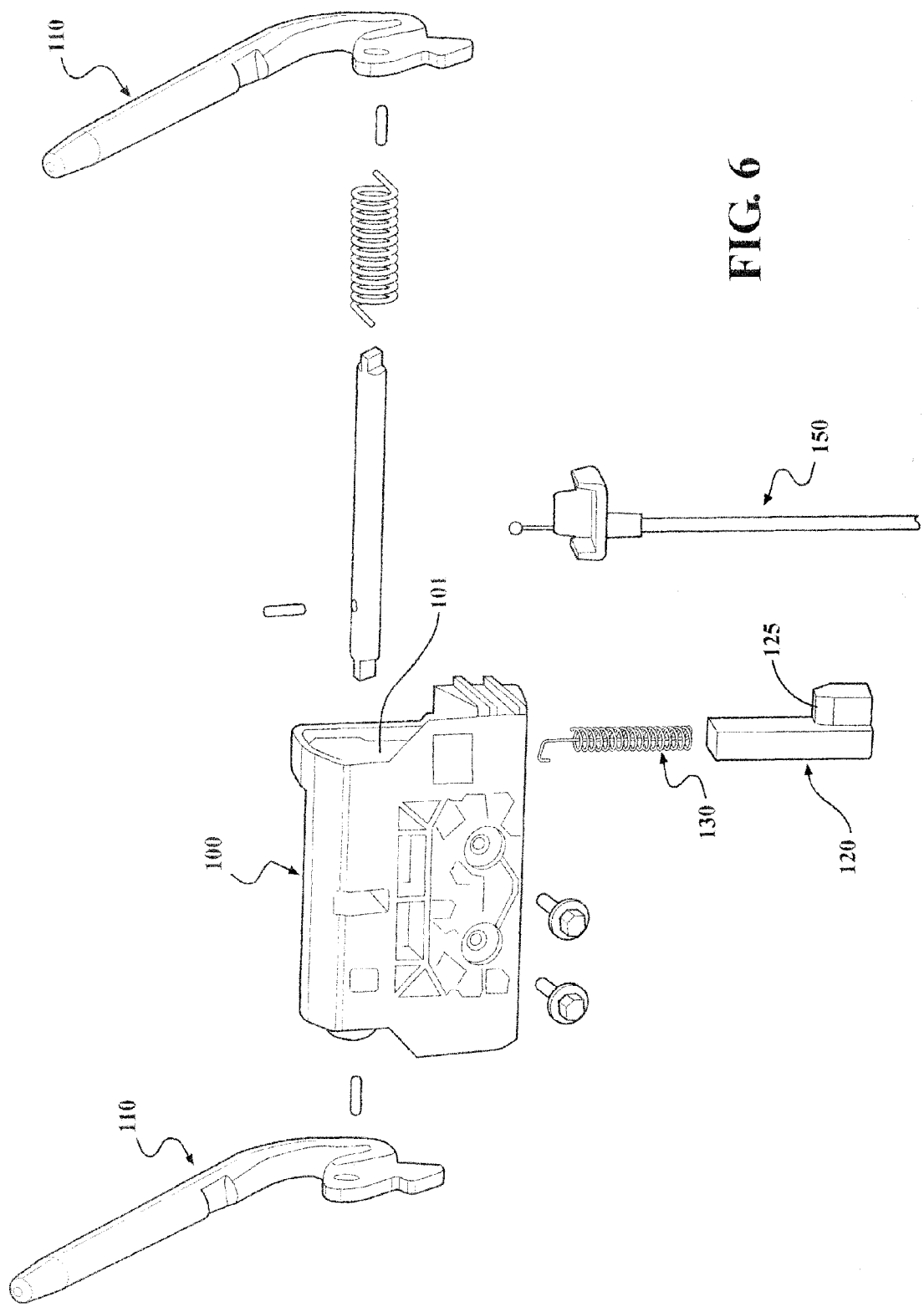
FIG. 6 is a perspective exploded view of a head restraint assembly according to the prior art.
Figure 8:
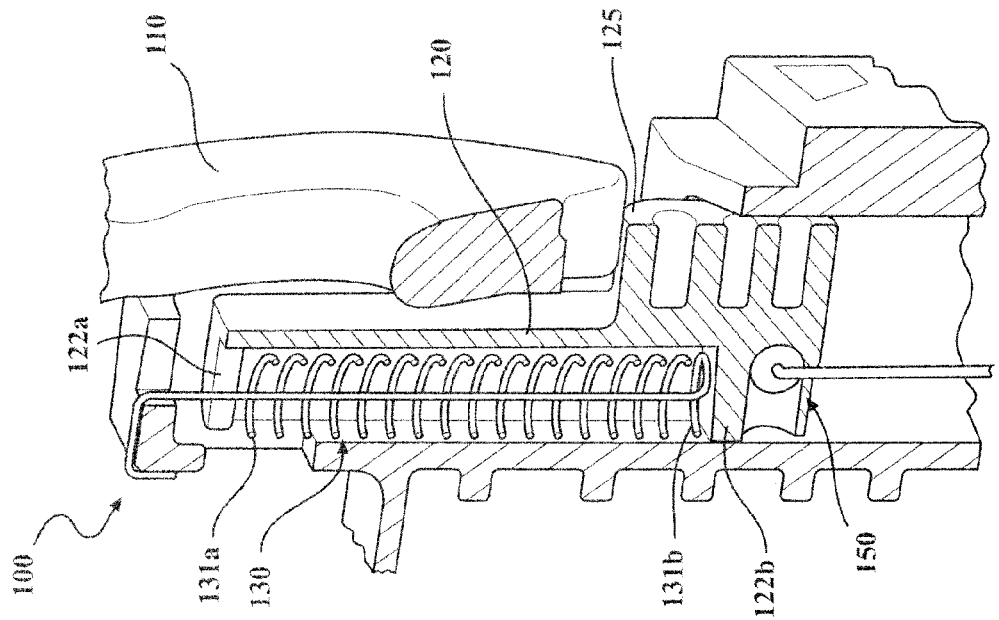
FIG. 8 is a detailed, cut-away view of a head restraint according to the present invention, showing the disposition of the spring element within the lock element.

Also according to the illustrated embodiment, the lock element 120 comprises part of a locking assembly including a remote release actuator 150 which effects selective sliding linear movement of the lock element 120 (in a generally vertical direction, according to the embodiment as depicted in FIGS. 6 and 8) between the positions of engagement (shown in FIG. 8) and disengagement (not depicted). Exemplary operation of such a remote release actuator 150, which may, for instance, comprise a cable release, is described in U.S. Pat. No. 7,717,516.

In the exemplary embodiment, as best shown in FIGS. 6 and 8, the lock element 120 includes a lock abutment 125 which engages at least one head restraint support 110 in the position of engagement of the lock element to thereby fix the at least one head restraint support in the upright position. Exemplary operation of such a lock abutment 125 is described in U.S. Pat. No. 7,717,516.

Optionally, the lock element 120 and lock abutment 125 may form a monolithic structure, as depicted. Alternatively, the lock element 120 and lock abutment 125 may be separately formed.

The lock element 120 and lock abutment 125 may also be selectively removable from the bracket 100, thereby facilitating assembly and disassembly of the head restraint assembly.

Per the exemplary embodiment of the illustrations, the portion of the spring element 130 extending beyond the lock element 120 comprises a hanger portion 132. The hanger portion 132 extends through a top of the lock element 120, as shown, and, as described further below, is associated with the bracket 100 to fix the position of the spring element 130 relative to the bracket 100.

Also per the illustrated embodiment, spring element 130 comprises a coil portion 131 captured in a hollow portion 121 of the lock element 120.

Figure 7:
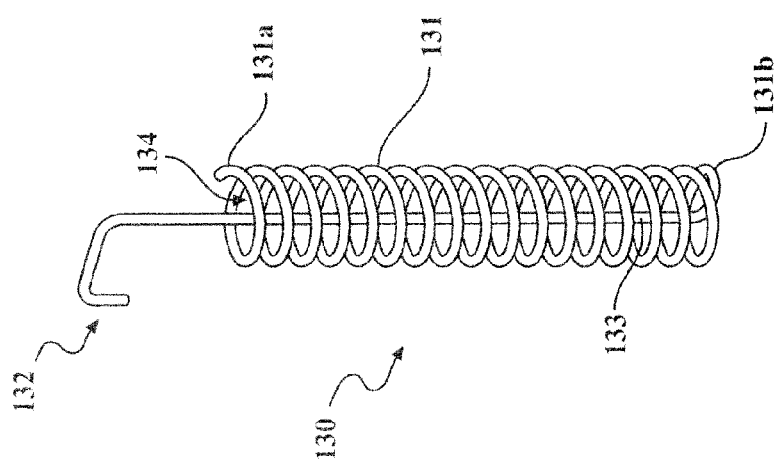
FIG. 7 is a perspective view of the spring element according to an exemplary embodiment of the present invention.

As shown best in FIG. 7, the spring element 130 of the exemplary embodiment may be monolithic, and comprises a linear portion 133 disposed in the hollow interior 134 of the coil portion 131. The linear portion 133 extends from a bottom end 131b of the coil portion 131 and through a top end 131a of the coil portion 131, and terminates in the hanger portion 132 proximate the top end 131a of the coil portion 131.

Still more particularly, it may be seen in FIG. 7 that the final winding of the coil portion 131 continues into the linear portion 133, which then extends upwardly through the interior 134 of the coil portion 131 to terminate in the hanger portion 132 above the top end 131a of the coil portion.

But while the foregoing is disclosed as an exemplary embodiment of the spring element 130, those skilled in the art will appreciate, with the benefit of this disclosure, that the spring element may take other forms. For instance, and without limitation, it is contemplated that the spring element 130 may be formed of multiple individual elements that are interconnected, rather than being monolithic. It is also contemplated that the spring element 130 need not be a coil spring.

Likewise, and again without limitation, it is contemplated that the portion of the spring element 130 extending beyond the lock element 120 need not comprise a hanger portion 132 as depicted. Instead, that portion, whether comprising a hanger portion or otherwise, may take any shape that serves the purpose of fixing the position of the spring element 130 relative to the bracket 100. So, for instance, the illustrated hanger portion 132 may be in the form of a straight bar, a disc-shaped plate, a square-shaped plate, etc.; subject only to the requirement that the hanger portion can be associated with the bracket 100 to fix the position of the spring element 130 relative thereto.

Figure 10:
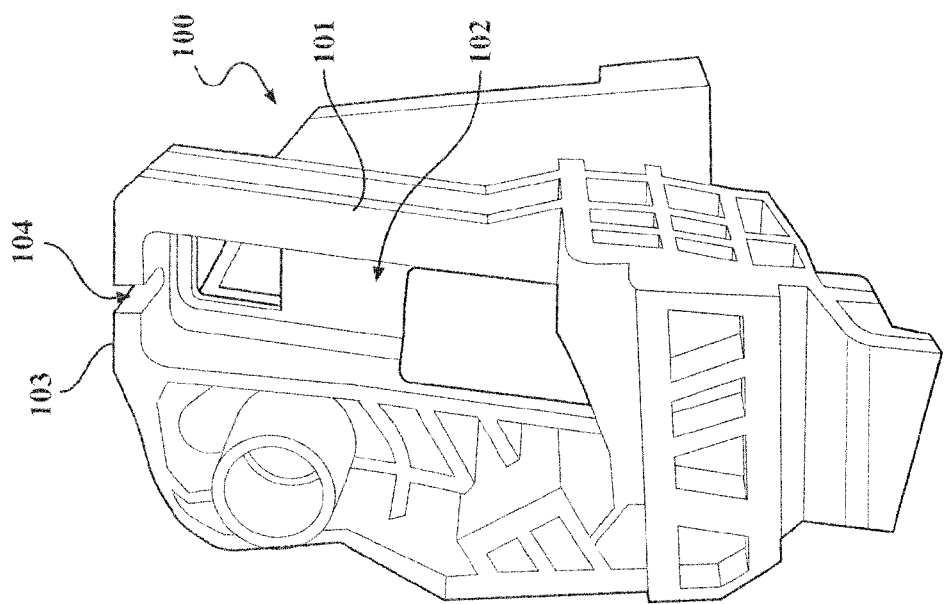
FIG. 10 is a detailed perspective view showing a portion of the bracket according to an exemplary embodiment of the present invention.
Figure 9:
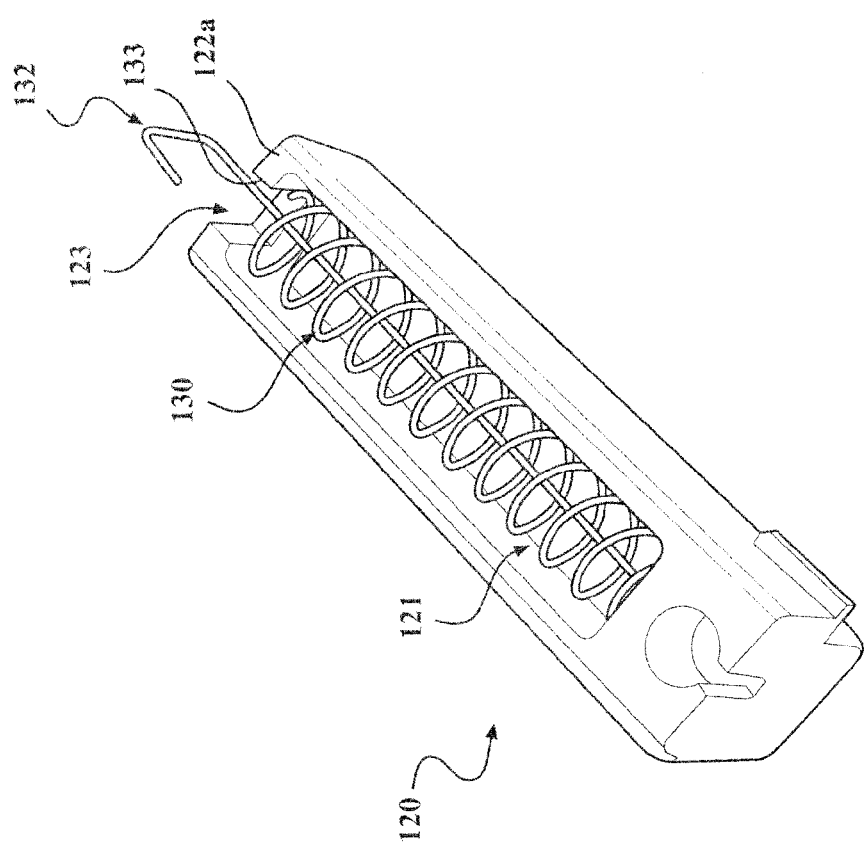
FIG. 9 is a detailed perspective view showing the spring element within the lock element.

Referring also to FIGS. 8 through 10, spring element 130 is received in the hollow portion 121 of the lock element 120, such that the bottom 131b and top 131a ends of the coil portion 131 abut opposing end walls 122a, 122b of the lock element 120. As shown, hollow portion 121 opens outwardly toward a side of the lock element 120 which faces the bracket 100 in the assembled head restraint.

The end wall 122a includes an open-ended slot 123 through which a length of linear portion 133 extends so that the hanger portion 132 is disposed above the lock element 120. Open-ended slot 123 is dimensioned so as to not permit the coil portion 131 to pass therethrough.

Figure 11:
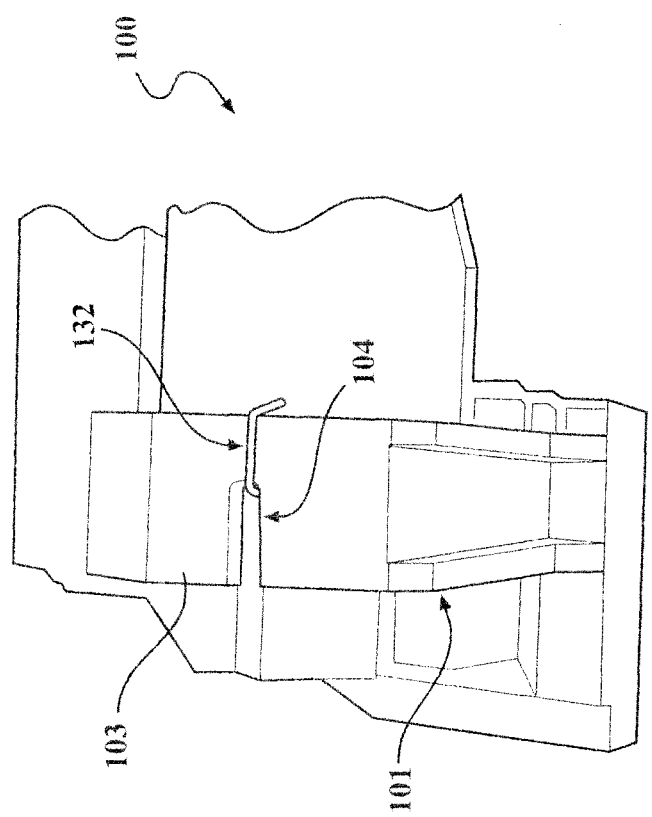
FIG. 11 is a detailed perspective view showing a portion of the bracket according to an exemplary embodiment of the present invention.

Lateral end wall 101 of bracket 100 has defined therein a partial channel 102 dimensioned to receive lock element 120 therein so that the lock element 120 is oriented with the hollow portion 121 facing inwardly toward the bracket 100 (i.e., so as to open towards the bracket), as best shown in FIGS. 8 and 10. The wall 103 defining the top end of this channel 102 has defined therein an open-ended slot 104 through which the hanger portion 132 extends. See FIG. 11. As shown in FIG. 11, the hanger portion 132 extends over the top surface of bracket 100. In this manner, the spring element 130 is associated with the bracket.

Figure 3:
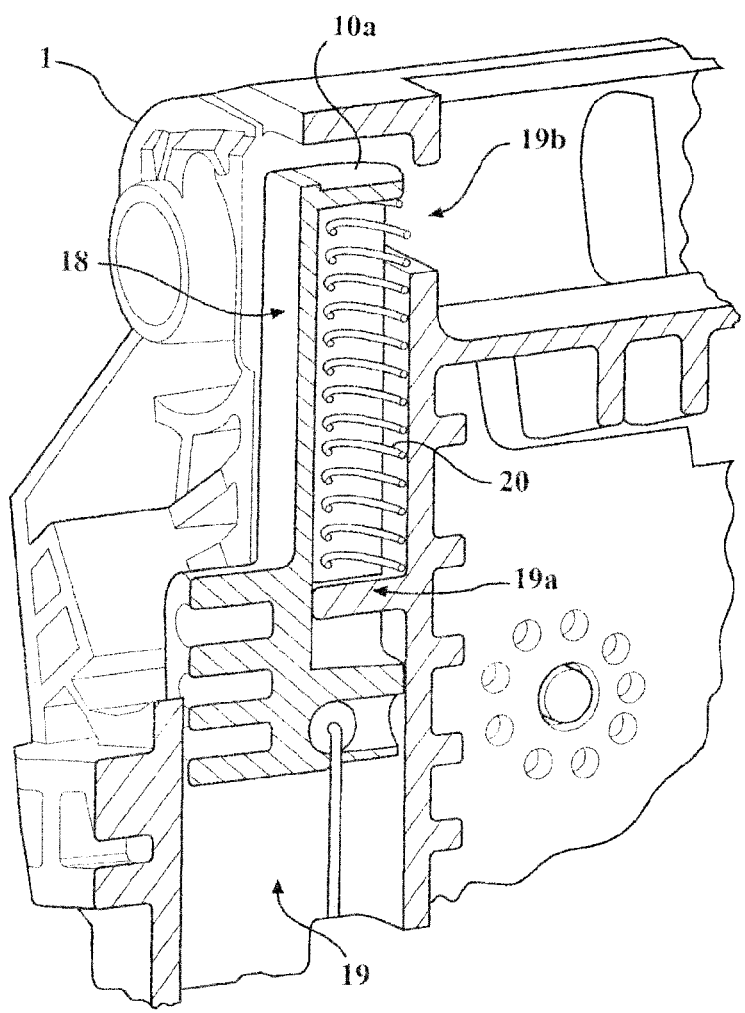
FIG. 3 is a detailed, cut-away view of the prior art head restraint assembly of FIG. 1, showing the disposition of the spring element within the lock element.
Figure 4:
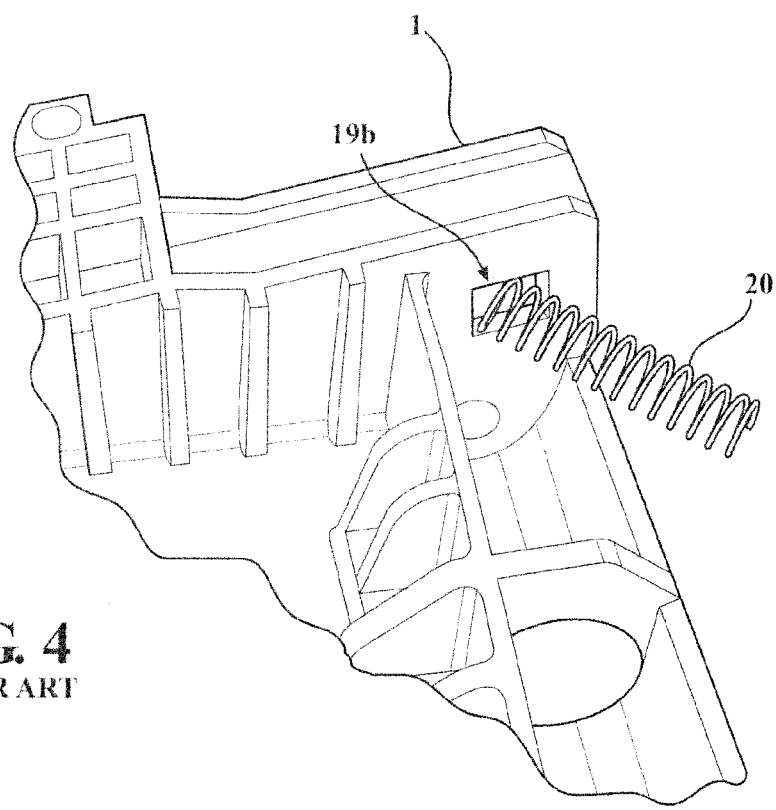
FIG. 4 is a detailed view of the prior art head restraint assembly of FIG. 1, showing the manner of inserting the spring element into the lock element through the bracket.
Figure 5:
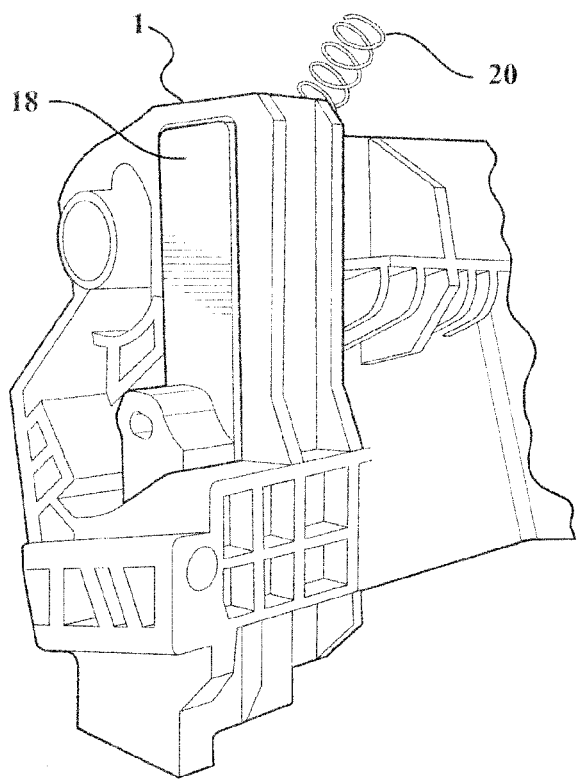
FIG. 5 is a detailed view of the prior art head restraint assembly of FIG. 1, showing the manner of inserting the spring element into the lock element through the bracket.

Further, and with reference to FIGS. 3 and 8 in particular, it can be seen that the bracket 100 of the present invention is characterized by the absence of the stop surface 19a of the prior art bracket 1 (FIG. 3). As described above, the opposite ends of the spring element 20 in the prior art head restraint assembly are captured between an upper wall of the lock element 18 and spring stop 19a projecting into the chamber 19 so that tension in spring element 20 urges the lock element 18 upward. According to the present invention, in contrast, compression of the spring element 130 is effected by the association of the spring element 130 to the bracket 100 via the hanger portion 132, as well as the fact that the coil portion 123 is captured within the hollow portion 121 of the lock element 120. By this arrangement, it will be appreciated that downward movement of the lock element 120 via operation of the remote release actuator 150 will result in compression of the spring element's coil portion 131 as the coil portion's free top end 131a is carried downwardly by the upper end 122a of the lock element 120 while the coil's bottom end 122b is maintained in a fixed position by the interconnection between that end 122b and the hanger portion 132 via the linear portion 133.

By virtue of the above-described construction of the exemplary embodiment, it will be appreciated that the head restraint assembly is more easily manufactured than the head restraint assembly of the prior art.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

The invention in which an exclusive property or privilege is claimed is defined as follows:

1. A head restraint assembly for pivotally supporting a head restraint above a seat back, the head restraint assembly comprising:
   a bracket pivotally mounting at least one head restraint support, the at least one head restraint support pivotally movable relative to the bracket between upright and folded positions;
   a lock element that is linearly movably disposed in the bracket, the lock element being selectively linearly movable from a position of engagement with the at least one head restraint support, in which the at least one head restraint support is fixed in the upright position, to a position of disengagement in which the at least one head restraint support is pivotally movable between the upright and folded positions thereof; and
   a spring element biasing the lock element in the position of engagement with the at least one head restraint support, the spring element including a coil portion captured in a hollow portion of the lock element, and a hanger portion extending beyond the lock element and associated with the bracket to fix the position of the spring element relative to the bracket.

2. The head restraint assembly of claim 1, wherein the spring element is monolithic, and comprises a linear portion disposed in the hollow interior of the coil portion, the linear portion extending from a bottom end of the coil portion and through a top end of the coil portion, the linear portion terminating in the hanger portion proximate the top end of the coil portion.

3. The head restraint assembly of claim 1, further comprising a remote release actuator effecting selective linear movement of the lock element between the positions of engagement and disengagement.

4. The head restraint assembly of claim 3, wherein the remote release actuator comprises a cable release.

5. The head restraint assembly of claim 1, wherein the lock element includes a lock abutment which engages the at least one head restraint support in the position of engagement of the lock element to thereby fix the at least one head restraint support in the upright position.

6. The head restraint assembly of claim 5, wherein the lock element and lock abutment form a monolithic structure.

7. The head restraint assembly of claim 5, wherein the lock element and lock abutment are selectively removable from the bracket.

8. A head restraint assembly, comprising:
   a bracket mountable to a vehicle seat;
   at least one head restraint support pivotally mounted on the bracket and movable between upright and folded positions;
   a locking assembly including a remote release actuator and a lock element that is linearly movably disposed in the bracket; and
   a spring element including a coil portion and a hanger portion, the coil portion captured in a hollow portion of the lock element, and the hanger portion extending through a top of the lock element and associated with the bracket to fix the position of the spring element relative to the bracket.

9. The head restraint assembly of claim 8, wherein the spring element is monolithic, and comprises a linear portion disposed in the hollow interior of the coil portion, the linear portion extending from a bottom end of the coil portion and through a top end of the coil portion, the linear portion terminating in the hanger portion proximate the top end of the coil portion.

10. The head restraint assembly of claim 8, wherein the remote release actuator comprises a cable release.

11. The head restraint assembly of claim 8, wherein the lock element includes a lock abutment, and at least one of the head restraint supports is configured to be engaged by the lock abutment to prevent pivotal movement of the head restraint supports.

12. The head restraint assembly of claim 11, wherein the lock abutment is integral with the lock element, and the lock element and lock abutment are linearly movably disposed in the bracket.

13. The head restraint assembly of claim 11, wherein the lock element and lock abutment form a monolithic structure.

14. The head restraint assembly of claim 11, wherein the lock element and lock abutment are selectively removable from the bracket.

\* \* \* \* \*